(12) United States Patent
Fraley et al.

(10) Patent No.: US 8,316,627 B1
(45) Date of Patent: Nov. 27, 2012

(54) WEED CUTTER

(75) Inventors: J. Phillip Fraley, Winfield, AL (US);
John W. Davis, III, Winfield, AL (US)

(73) Assignee: King Kutter, Inc., Winfield, AL (US)

( * ) Notice: Subject to any disclaimer, the term of this patent is extended or adjusted under 35 U.S.C. 154(b) by 0 days.

(21) Appl. No.: 12/730,025

(22) Filed: Mar. 23, 2010

Related U.S. Application Data (60) Provisional application No. 61/162,424, filed on Mar. 23, 2009.

(51) Int. Cl.
*A01D 75/18* (2006.01)
(52) U.S. Cl. .......................................... 56/10.4; 56/13.6
(58) Field of Classification Search .............. 56/10.4, 56/320.1, 15.3, 13.6; 144/4.1, 34.1–34.6
See application file for complete search history.

(56) References Cited

U.S. PATENT DOCUMENTS

| | | | | |
|---|---|---|---|---|
| 2,838,901 | A * | 6/1958 | Davis | 56/10.3 |
| 3,059,704 | A * | 10/1962 | Kasatkin | 172/38 |
| 3,750,376 | A * | 8/1973 | Cioni | 56/10.4 |
| 4,901,508 | A * | 2/1990 | Whatley | 56/10.4 |
| 5,396,754 | A * | 3/1995 | Fraley | 56/15.2 |
| 6,301,863 | B1 * | 10/2001 | Liebrecht | 56/10.6 |
| 6,591,592 | B1 * | 7/2003 | Krimminger | 56/10.4 |

* cited by examiner

*Primary Examiner* — Alicia Torres
(74) *Attorney, Agent, or Firm* — Angela Holt; Bradley Arant Boult Cummings LLP (57) ABSTRACT

A weed cutter that may be pulled behind a tractor is provided. The weed cutter has plurality of cutting blades that rotate when acted upon by planetary gears rotating around a central sun gear. A planetary gearbox assembly with a cloverleaf shape rotates partially around fence posts and other objects to cut weeds growing around the objects.

9 Claims, 6 Drawing Sheets

WEED CUTTER

CROSS-REFERENCE TO RELATED APPLICATIONS

This application claims the benefit of U.S. Provisional Application No. 61/162,424 filed on Mar. 23, 2009, the entire contents of which are herein incorporated by reference.

FIELD OF THE INVENTION

The present invention relates generally to the field of tractor-based, rotary-driven power equipment, and more particularly relates to a weed cutter.

BACKGROUND AND SUMMARY OF THE INVENTION

Traditional weed cutters must be manually guided around corners and obstacles. Using a tractor to cut weeds around objects like fence posts, for example, can therefore be a challenge. However, cutting weeds around fence posts with a hand-held weed cutter is quite labor intensive.

A weed cutter of the present disclosure provides a cutting deck with a unique "cloverleaf" shape that rotates around fence posts, cutting weeds from around three sides of the fence posts while the cutter moves in a single direction of travel. In one embodiment, the weed cutter comprises three (3) cutting heads that comprise planetary gears rotating around the perimeter of a central sun gear.

In one embodiment, the weed cutter is attached to and is pulled behind a tractor that powers the cutter. In this regard, a gearbox on the cutter connects to the power take-off (PTO) of the tractor, which provides rotation to the cutter's gears, which translates the rotation from the PTO to rotary cutting blades that cut grass and other ground vegetation.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

Figure 1:
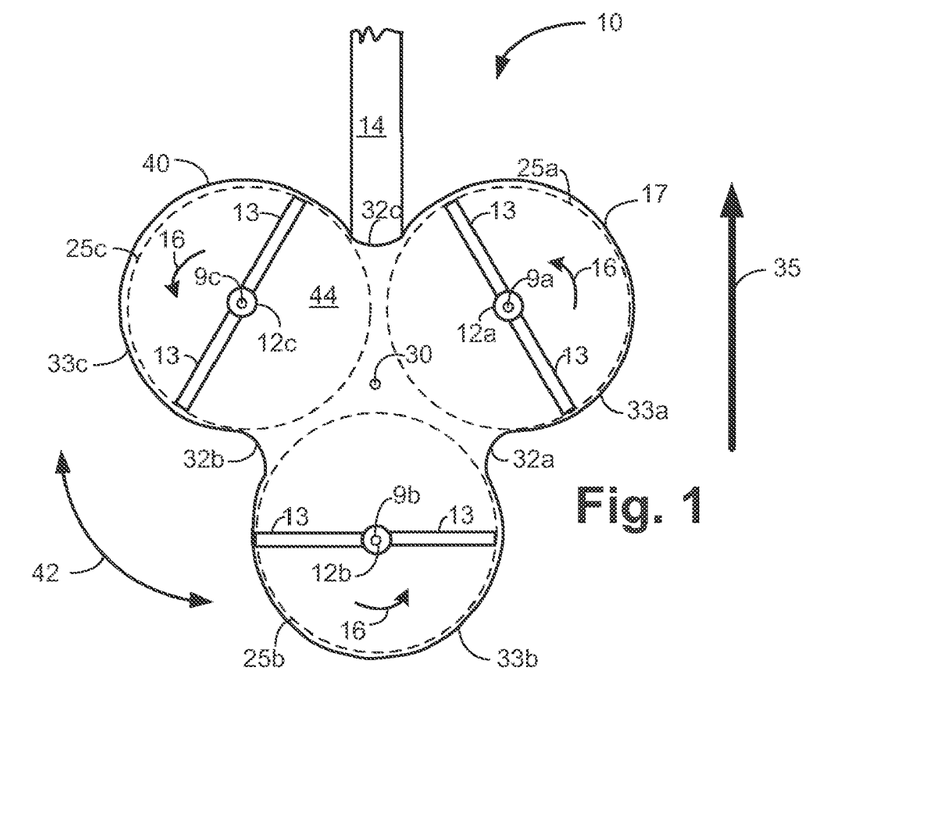
FIG. 1 is a bottom plan view of an exemplary weed cutter in accordance with an embodiment of the present disclosure.

FIG. 1 is a bottom plan view of a weed cutter 10 according to an exemplary embodiment of the present disclosure. The weed cutter 10 comprises a plurality of cutting heads 12a-12c comprising blades 13 that extend from the cutting heads 12a-12c. Each cutting blade 13 has at least one sharpened edge (not shown) for cutting weeds (not shown).

Each cutting head 12a-12c rotates or spins around an axis 9a-9c, respectively, in the direction indicated by directional arrows 16. The rotation of the cutting heads 12a-12c defines circular footprints 25a-25c that are the cutting area of the blades 13 attached to cutting heads 12a-12c. Although the illustrated embodiment depicts three (3) cutting heads 12a-12c, more or fewer cutting heads may be employed in other embodiments.

A planetary gearbox assembly 40 is a housing containing gears (not shown) that impart rotation to the cutting heads 12a-12c, as further described herein. The planetary gearbox assembly 40 comprises a top plate (not shown), a bottom plate 44, and an edge guard 17. The edge guard 17 is disposed outside of the circular footprints 25a-25c that define the cutting area of the blades 13 attached to cutting heads 12a-12c. Because the edge guard 17 extends outside of the circular footprints 25a-25c, the edge guard 17 protects the blades 13 from damage due to side impacts between the gearbox 40 and an obstacle (not shown).

The edge guard 17 comprises a plurality of convex protrusions 33a-33c corresponding to and slightly larger than the circular footprints 25a-25c, respectively. Note that cutting head 12a is disposed directly beneath protrusion 33a, cutting head 12b is disposed directly beneath protrusion 33b, and cutting head 12c is disposed directly beneath protrusion 33c.

The edge guard 17 further comprises a plurality of indentations 32a-32c, such that the general shape of the edge guard 17 is similar to a three-leaf clover in the illustrated embodiment. The indentation 32a is disposed between convex protrusions 33a and 33b; the indentation 32b is disposed between convex protrusions 33b and 33c; the indentation 32c is disposed between convex protrusions 33c and 33a.

The planetary gearbox assembly 40 rotates around a central axis 30 in the direction indicated by directional arrow 42.

In one embodiment, a shaft 14 connects to a tractor (not shown) and transfers rotation from the tractor to the planetary gearbox assembly 40. In this regard, the shaft 14 connects to the power take-off (PTO) (not shown) of the tractor. As is known by persons of skill in the art, a PTO is a splined driveshaft on a tractor or truck that is used to provide power to an attachment or separate machines. The PTO provides rotation to the shaft 14, which imparts rotation to the planetary gearbox assembly 40, as further discussed herein. The tractor typically moves in the direction shown by directional indicator 35. In other embodiments of the cutter 10, the rotation of the planetary gearbox assembly 40 may be driven by a mower instead of a tractor.

Figure 2:
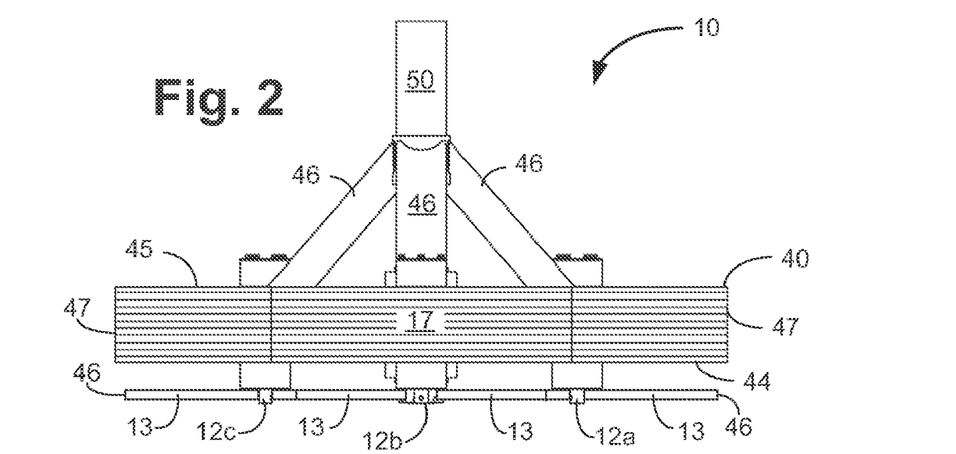
FIG. 2 is an end view of the weed cutter of FIG. 1.

FIG. 2 is an end view of the weed cutter 10 of FIG. 1. A plurality of support arms 46 extend from a top plate 45 of the planetary gearbox assembly 40 and support a shaft sleeve 50, as further discussed with respect to FIG. 11 herein. The shaft sleeve 50 connects to a lift frame (not shown) which structurally supports the weed cutter 10. In this embodiment, the cutting heads 12a-12c extend below the bottom plate 44 of the planetary gearbox assembly 40, but the outside edges 46 of the blades 13 do not extend past the outside edges 47 of the edge guard 17.

Figure 3:
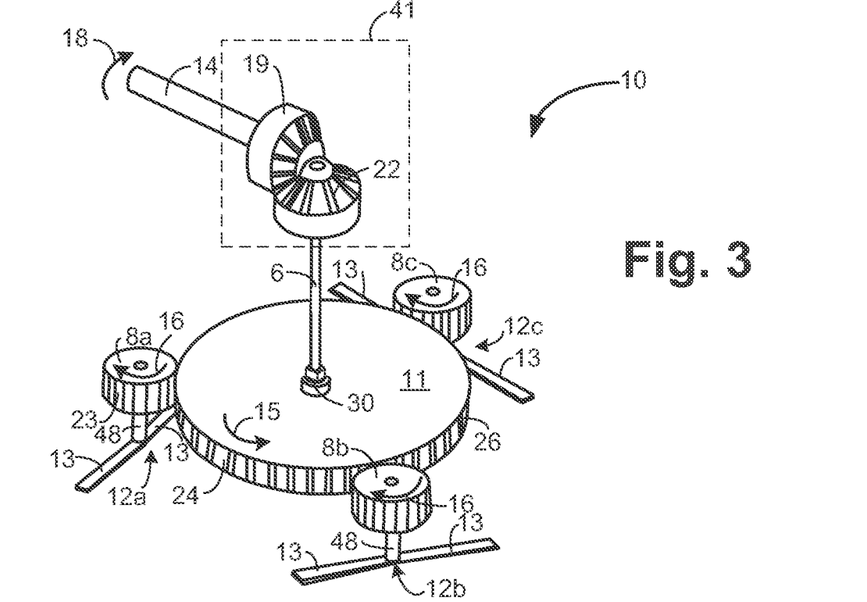
FIG. 3 is a functional representation of the gears of the weed cutter of FIG. 1.

FIG. 3 is a functional representation of exemplary gears that operate the weed cutter 10 according to an embodiment of the present disclosure. A centrally-located rotating sun gear 11 rotates around a central axis 30. The sun gear 11 rotatably connects to a plurality of planetary gears 8a-8b which correspond to cutting heads 12a-12c. In this regard, the sun gear 11 comprises a plurality of teeth 24 that interlock with teeth 23 on the planetary gears 8a-8c.

Each of the planetary gears 8a-8c connects to its corresponding cutting head 12a-12c via a shaft 48, such that the cutting heads 12a-12c rotate with the planetary gears 8a-8c. When the sun gear 11 rotates in the direction indicated by directional arrow 15, the planetary gears 8a-8c and the cutting heads 12a-12c rotate in the direction indicated by directional arrows 16. The cutting heads 12a-12c rotate at higher speeds than the sun gear 11

The sun gear 11 receives rotation from the shaft 14 via a right angle gearbox 41 which comprises gears 19 and 22 that translate rotation from the shaft 14, which is generally vertically oriented, to a vertical shaft 6 rigidly affixed to the sun gear 11. When the shaft 14 rotates in the direction indicated by directional arrow 18, the sun gear 11 rotates in the direction indicated by directional arrow 15.

In other embodiments, a different right angle gearbox 41 may be used that reverses the rotation of the sun gear 11 from the direction indicated by directional arrow 15.

Figure 4:
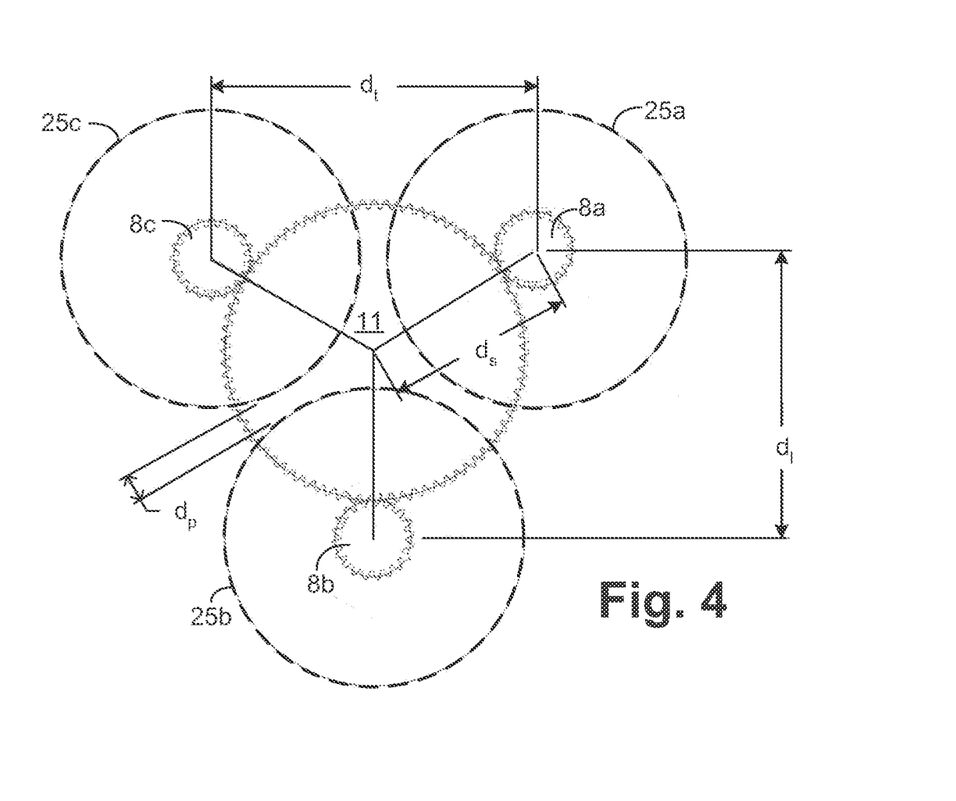
FIG. 4 depicts the gears of an exemplary weed cutter in accordance with an embodiment of the present disclosure.

FIG. 4 depicts the gears 11 and 8a-8c of the weed cutter 10 (FIG. 1) according to an embodiment of the present disclosure. In this embodiment, the sun gear 11 and planetary gears 8a-8c are configured such that the sun gear 11 rotates at a speed of about 750 rpm and the cutting heads 8a-8c rotate at a speed of about 3000 rpm. Exemplary dimensions that result in these rotation speeds are:
  a. an outer diameter of the sun gear 11 of 20 inches;
  b. an outer diameter of the planetary gears 8a-8c of 5 inches;
  c. an outer diameter of the circular footprints 25a-25c (defined by the outside edges 46 (FIG. 2) of the cutting blades 13 (FIG. 2) of about 20 inches;
  d. a distance $d_s$ between a center of the sun gear 11 to a center of the cutting heads 12a-12c of 12.550 inches;
  e. a longitudinal distance $d_l$ between a center of the cutting head 12a and the cutting head 12b of 18.825 inches;
  f. a transverse distance $d_t$ between the center of the cutting head 12a and the center of the cutting head 12c of 21.737 inches;
  g. a distance $d_p$ between the outside perimeter of circular footprints 25b and 25c of 1.737 inches.

The rotation speeds and related dimensions are provided for exemplary purposes only, and other rotation speeds and dimensions may be utilized in other embodiments.

Figure 5:
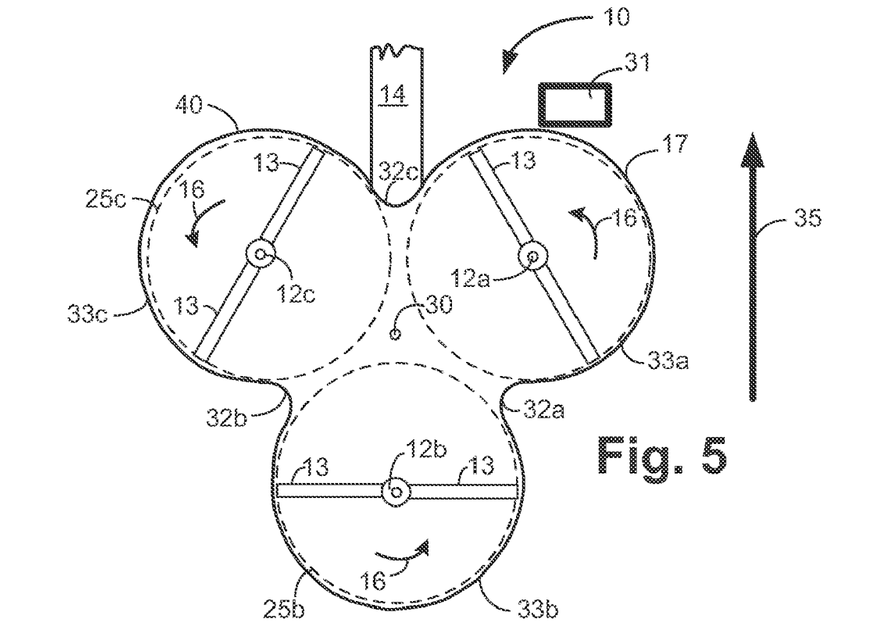
FIG. 5 depicts an exemplary weed cutter just before the cutter comes in contact with a fence post.

FIG. 5 is a bottom view of an exemplary cutter 10 in operation, just before the protrusion 33a of the cutter 10 comes in contact with a fence post 31. In this embodiment, the cutter 10 is attached to the PTO of a tractor (not shown), which rotates the shaft 14 and causes the cutting heads 12a-12c to rotate. The cutter 10 is pulled behind the tractor with the tractor moving in the direction indicated by directional arrow 35. Before the protrusion 33a contacts the fence post 31, the planetary gearbox assembly 40 does not rotate, as in this embodiment the gearbox assembly rotates only when acted on by an outside force.

Figure 6:
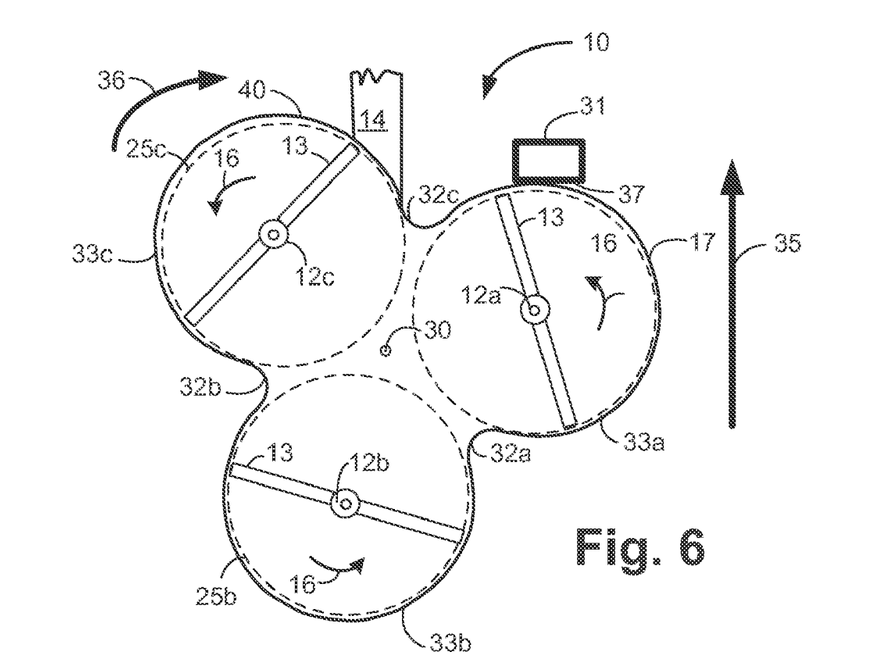
FIG. 6 depicts the weed cutter FIG. 4, after the cutter has contacted the fence post.

FIG. 6 depicts the cutter 10 of FIG. 5, after the protrusion 33a has contacted the fence post 31. The force of the fence post 31 coming in contact with the guard 17 causes the planetary gearbox assembly 40 to begin to rotate around its central axis 30 in the direction indicated by directional arrow 36. This rotation causes the blades 13 of the cutting head 12a to cut undergrowth (not shown) adjacent to a first side 37 of the fence post 31. In this regard, although the edge guard 17 prevents the blades 13 from contacting the fence post 31, the blades 13 extend beneath the guard 17 and contact the undergrowth beneath the guard 17 to cut the undergrowth.

Note that the rotation of the planetary gearbox assembly 40 when it contacts the fence post 31 is in the opposite direction from the rotation of the cutting heads 12a-12c. In this embodiment, the rotation of the cutting heads 12a-12c is intended to somewhat "resist" the rotation of the assembly 40. In other embodiments, the rotation of the cutting heads 12a-12c may be in the same direction as the intended rotation of the assembly 40, in order to assist the forward motion of the assembly 40 around the post 31. Therefore, different gear configurations than those discussed herein may be employed without departing from the scope of the present disclosure.

Figure 7:
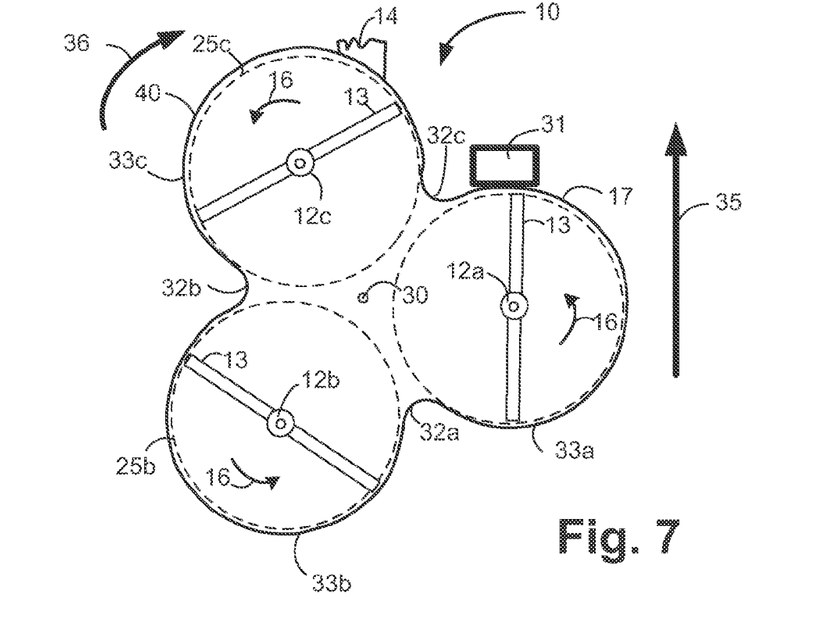
FIG. 7 depicts the cutter of FIG. 4, as the cutter continues to rotate around the fence post.

FIG. 7 depicts the cutter 10 of FIG. 5, as the planetary gearbox assembly 40 continues to rotate "around" the fence post 31 in the direction indicated by directional arrow 36. In this regard, protrusion 33a contacts first side 37 of the fence post 31 and the blades 13 of cutting head 12a continue to cut weeds adjacent to the fence post 31. Because the blades 13 do not extend beyond the perimeter of the protrusion 33a, the blades 13 do not contact the fence post 31 itself.

Figure 8:
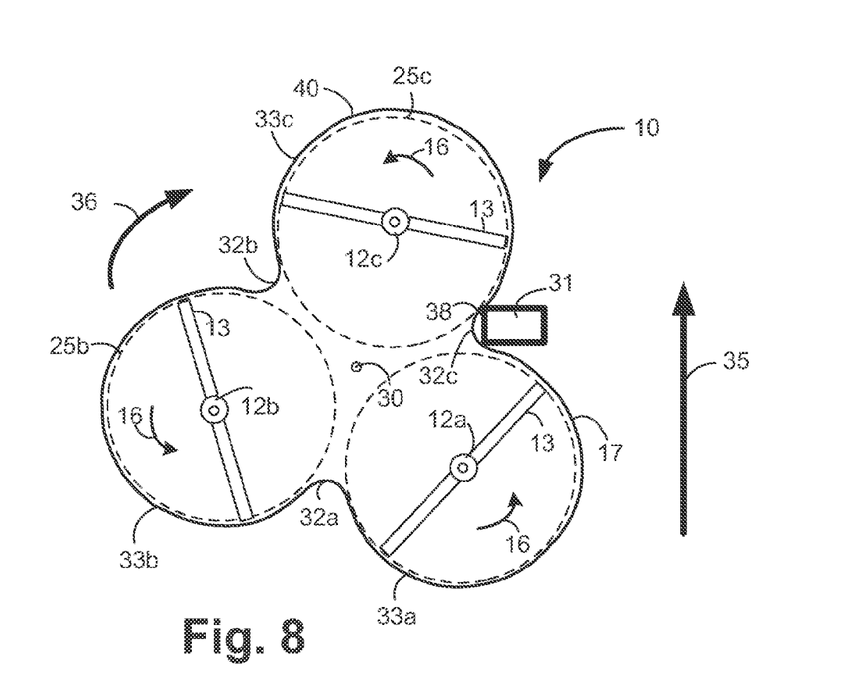
FIG. 8 depicts the cutter of FIG. 4, as the fence post contacts the indentation.

FIG. 8 depicts the cutter 10 of FIG. 5, as the fence post 31 contacts the indentation 32c. As the planetary gearbox assembly 40 continues to rotate around the fence post 31, the fence post contacts protrusion 33a, indentation 32c, and then protrusion 33c, and the blades 13 on the cutting heads 12a and 12c cut the undergrowth adjacent to a second side 38 of the fence post 31.

Figure 9:
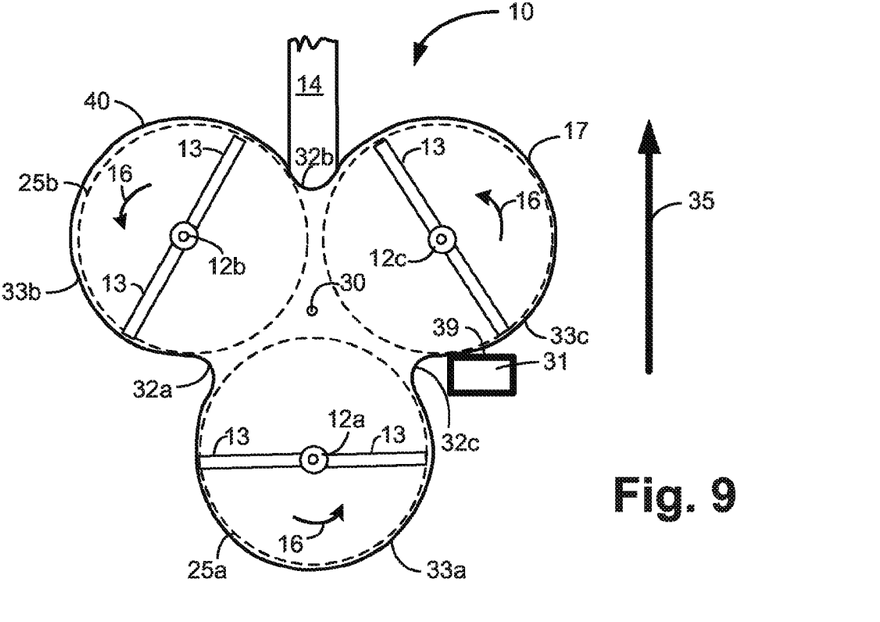
FIG. 9 depicts the cutter of FIG. 4, as the cutter continues to rotate around the fence post.

FIG. 9 depicts the cutter 10 of FIG. 5, as the planetary gearbox assembly 40 continues to rotate around the fence post 31 with the protrusion 33c contacting a third side 39 of the fence post 31 and the blades 13 on the cutting head 12c cuts weeds adjacent to the third side 39 of the fence post 31. At this point the planetary gear assembly 40 has rotated 120 degrees from its initial position (shown in FIG. 5) and the planetary gear assembly 40 is in position to encounter another fence post and start the process again.

Note that the orientation of the cutter 10 rotating around the fence post 31 enables the cutter 10 cut around three sides, namely first side 37 (FIG. 5), second side 38 (FIG. 7) and third side 39 (FIG. 9) of the fence post 31 with the tractor still traveling in generally the same direction, i.e., the direction indicated by directional arrow 35. If the user (not shown) is cutting weeds along a fence row, the user may drive the tractor along one side of the fence to cut around three sides of each fence post and then may drive the tractor along the other side of the fence to cut the remaining weeds from the fourth side of each fence post. Although the description herein references four sides of a fence post, the weed cutter 10 may rotate around and thus cut weeds around objects of many different shapes, such as round fence posts. Further, although the description herein refers to fence posts, the weed cutter 10 may cut weeds adjacent to many different types of objects.

Figure 10:
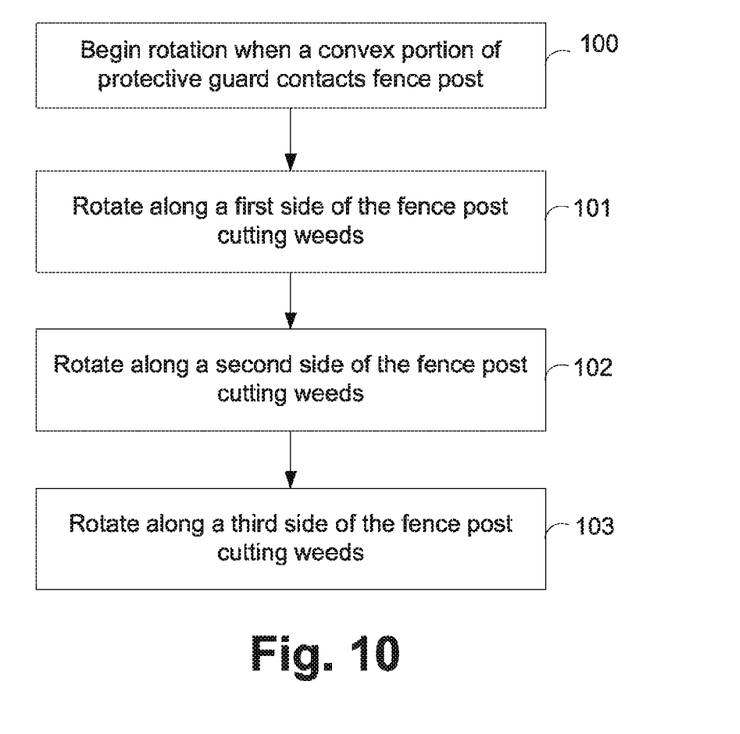
FIG. 10 is a functional flowchart illustrating an exemplary method of cutting weeds in accordance with an embodiment of the present disclosure.

FIG. 10 depicts a method of cutting weeds according to an embodiment of the present disclosure. In step 100 of the method, the planetary gearbox assembly 40 of the weed cutter 10 begins to rotate when its convex portion (33a, 33b or 33b) (FIG. 5) contacts a fence post 31 (FIG. 5). In step 101, the cutting blades 13 (FIG. 5) cut undergrowth adjacent to the first side 37 of the fence post 31 (FIG. 1) as the planetary gearbox assembly 40 rotates slowly around the fence post 31. In step 102, the cutting blades 13 cut undergrowth adjacent to a second side 38 (FIG. 8) of the fence post 31 as the planetary gearbox assembly 40 continues to slowly rotate around the fence post 31. In step 103 of the method, the cutting blades 13 cut undergrowth adjacent to a third side 39 (FIG. 9) of the fence post 31 as the planetary gearbox assembly 40 completes its partial rotation around the fence post 31.

Figure 11:
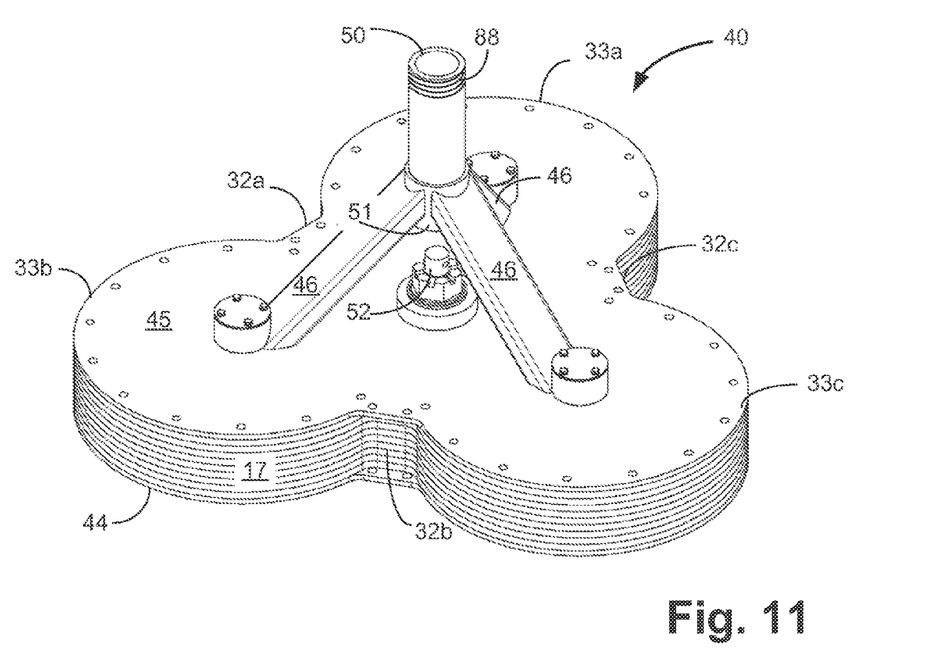
FIG. 11 is a perspective view of a planetary gearbox assembly according to an embodiment of the present disclosure.

FIG. 11 is a perspective view of an exemplary planetary gearbox assembly 40 according to an embodiment of the present disclosure. The plurality of support arms 46 extends from the top plate 45 of the planetary gearbox assembly 40 and supports the shaft sleeve 50, which is disposed generally perpendicularly with respect to the top plate 45. The shaft sleeve 50 connects to the lift frame (not shown) which structurally supports the weed cutter 10 while allowing the planetary gearbox assembly 40 to rotate freely when acted upon by an outside force, as discussed previously.

The shaft sleeve 50 contains threads 88 for receiving a nut (not shown). A swivel fitting (not shown) is installed on the shaft sleeve 50 and secured by the nut. The swivel fitting comprises bearings and allows the planetary gearbox assembly 40 to rotate freely as discussed above.

The sleeve 50 is hollow so that it can receive the shaft 6 (FIG. 3) that connects the sun gear 11 with the right angle gearbox 41 (FIG. 3), via fitting 52. The shaft 6 thus rotates independently from the sleeve 50.

In this embodiment, a bottom end 51 of the shaft sleeve 50 terminates above the top plate 45 of the planetary gearbox assembly 40, i.e., the shaft sleeve does not extend downwardly all the way to the top plate 45.

Figure 12:
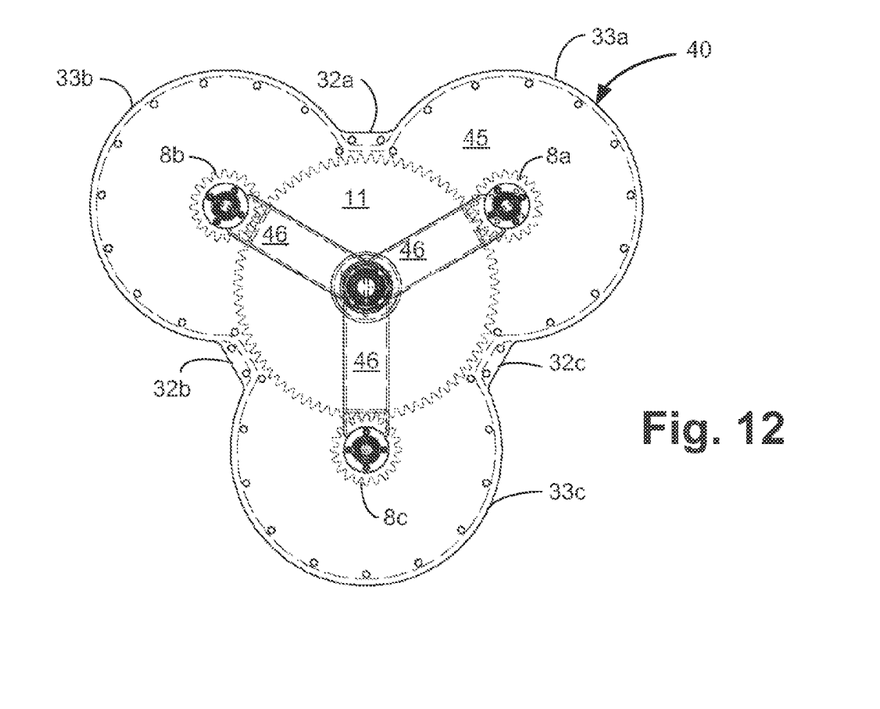
FIG. 12 is a top plan view of a planetary gearbox assembly according to an embodiment of the present disclosure

FIG. 12 is a top plan view of a planetary gearbox assembly 40 according to an embodiment of the present disclosure. The sun gear 11 and planetary gears 8a-8c are shown in dashed lines as they are disposed beneath the top plate 45 of the planetary gearbox assembly 40. In this embodiment, the gearbox assembly 40 forms a cloverleaf shape when viewed from the top, with a plurality of protrusions 33a-33c each alternating with a plurality of indentations 32a-32c.

Although the illustrated embodiment is in a general cloverleaf shape with three protrusions 33a-33c, other configurations of the cutter 10 may be employed without departing from the scope of the present disclosure. For example, the cutter 10 may have two (2) or four (4) protrusions, wherein each protrusion is associated with a cutting head as described herein.

What is claimed is:

1. A weed cutter comprising:
   a rotatable housing rotatably affixed to a rear of a tractor and pulled behind the tractor, the housing comprising:
   a rotating shaft coincident with a central axis, the rotating shaft receiving rotation from a rear power take-off of the tractor;
   a sun gear rotating around the central axis, wherein the sun gear receives rotation from the rotating shaft;
   a hollow shaft sleeve spaced-apart from a top plate of the housing by a plurality of support arms such that a bottom end of the shaft sleeve terminates above the top plate of the housing, the shaft received by and rotatable within the sleeve;
   a plurality of planetary gears rotatably connected to the sun gear, wherein the planetary gears rotate around the sun gear as the sun gear rotates;
   an edge guard around the perimeter of the housing;
   at least one cutting blade associated with each planetary gear and disposed beneath the housing,
   wherein each cutting blade rotates when its respective planetary gear rotates,
   wherein when the edge guard contacts an object, the housing begins to rotate around the object and the cutting blades cut weeds adjacent to the object, and
   wherein the cutting blades are not extendable into the earth.

2. The weed cutter of claim 1, wherein the plurality of planetary gears comprises three (3) planetary gears.

3. The weed cutter of claim 1, wherein the housing is in the general shape of a cloverleaf with a plurality of protrusions alternating with a plurality of indentations.

4. The weed cutter of claim 3, wherein each protrusion corresponds to at least one cutting blade.

5. A weed cutter comprising:
   a cloverleaf-shaped housing rotatably affixed to a rear of a tractor and pulled behind the tractor, the housing rotatable around a central axis, the housing comprising a plurality of protrusions alternating with a plurality of indentations, the housing further comprising a top plate;
   a plurality of rotating cutting blades, each cutting blade disposed beneath a protrusion;
   a sun gear rotating around the axis, wherein the sun gear receives rotation from a central shaft coincident with the central axis, the central shaft receiving rotation from a rear power take-off of the tractor;
   a plurality of planetary gears rotatably connected to the sun gear, wherein the planetary gears rotate around the sun gear as the sun gear rotates, and wherein each planetary gear is associated with a respective cutting blade,
   a plurality of support arms extending upwardly and angularly from the top plate of the housing, the plurality of support arms terminating at and rigidly affixed to a hollow shaft sleeve that receives the shaft, the hollow shaft sleeve substantially perpendicular to the top plate, a bottom end of the hollow shaft sleeve terminating above the top plate, such that the shaft sleeve is spaced apart from the top plate;
   wherein a footprint defined by a cutting area of each cutting blade is disposed within a footprint of each protrusion, and
   wherein the cutting blades are not extendable into the earth.

6. The weed cutter of claim 5, wherein when one of the plurality of protrusions contacts an object, the housing rotates such that the cutting blade beneath the protrusion cuts undergrowth adjacent to the object.

7. The weed cutter of claim 5, wherein each planetary gear is disposed within one of the protrusions and causes its respective cutting blade to rotate.

8. A weed cutter comprising:
   a housing rotatable about a central axis, the housing rotatably affixed to a rear of a tractor and pulled behind the tractor, the housing comprising
   a first protrusion, wherein the first protrusion is associated with a first cutting head disposed beneath the housing, the first cutting head comprising at least one cutting blade;
   a second protrusion, wherein the second protrusion is associated with a second cutting head, the second cutting head comprising at least one cutting blade;
   an indentation between the first protrusion and the second protrusion;

a support arm associated with each protrusion, the support arms extending upwardly and angularly from a top plate of the housing, the support arms terminating at and rigidly affixed to a hollow shaft sleeve that receives a central rotating shaft, the rotating shaft coincident with the central axis and receiving rotation from a rear power take-off of the tractor, the hollow shaft sleeve substantially perpendicular to the top plate, a bottom end of the hollow shaft sleeve terminating above the to late such that the shaft sleeve is spaced apart from the top plate;

a sun gear rotating around the axis, wherein the sun gear receives rotation from the shaft;

a plurality of planetary gears rotatably connected to the sun gear, wherein the planetary gears rotate around the sun gear as the sun gear rotates, and wherein each planetary gear is associated with a respective cutting blade, wherein when the first protrusion contacts an object, the housing begins to rotate around the object such that the first protrusion first contacts the object, then the indentation contacts the object, and then the second protrusion contacts the object, and wherein the cutting blades are not extendable into the earth.

9. The weed cutter of claim 8, wherein each planetary gear causes its associated cutting blade to rotate.

\* \* \* \* \*